United States Patent
Handl et al.

(10) Patent No.: US 9,744,885 B2
(45) Date of Patent: Aug. 29, 2017

(54) VEHICLE SEAT WITH A LOCKING UNIT

(71) Applicant: JOHNSON CONTROLS GMBH, Burscheid (DE)

(72) Inventors: Patrick Handl, Köln (DE); Andreas Vedder, Haan (DE); Uwe Moeller, Solingen (DE); Igor Gordeenko, Frechen (DE); Oezkan Demirci, Bochum (DE); Dennis Pohlscheidt, Troisdorf (DE); Martin Christall, Solingen (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 9 days.

(21) Appl. No.: 14/768,081

(22) PCT Filed: Feb. 10, 2014

(86) PCT No.: PCT/EP2014/052505
§ 371 (c)(1),
(2) Date: Aug. 14, 2015

(87) PCT Pub. No.: WO2014/124887
PCT Pub. Date: Aug. 21, 2014

(65) Prior Publication Data
US 2016/0001678 A1   Jan. 7, 2016

(30) Foreign Application Priority Data
Feb. 15, 2013  (DE) .................. 10 2013 002 820

(51) Int. Cl.
*B60N 2/20* (2006.01)
*B60N 2/22* (2006.01)
(Continued)

(52) U.S. Cl.
CPC ....... *B60N 2/2245* (2013.01); *B60N 2/01583* (2013.01); *B60N 2/20* (2013.01); *B60N 2/366* (2013.01); *B60N 2/682* (2013.01)

(58) Field of Classification Search
CPC .... B60N 2/2245; B60N 2/01583; B60N 2/20; B60N 2/366; B60N 2/682
(Continued)

(56) References Cited

U.S. PATENT DOCUMENTS 5,267,777 A * 12/1993 Valtri ................. A47C 3/026
                                                         297/302.1
5,556,168 A *  9/1996 Dinsmoor, III ......... A61G 5/12
                                                         297/440.2
(Continued)

FOREIGN PATENT DOCUMENTS

DE  10 2008 033 304 A1  1/2010
DE  10 2008 051 832 A1  4/2010
(Continued)

*Primary Examiner* — Syed A Islam
(74) *Attorney, Agent, or Firm* — McGlew and Tuttle, P.C.

(57) ABSTRACT

A vehicle seat (1) includes a structural part (3) which has a lock connection plate (60) and a locking unit (10) which is fixed to the lock connection plate (60). The locking unit (10) has at least one bearing bolt (51) with a passage opening (55). The lock connection plate (60) also comprises at least one mating contour (62) which projects into the passage opening (55) in the at least one bearing bolt (51).

20 Claims, 2 Drawing Sheets

(51) Int. Cl.
*B60N 2/68* (2006.01)
*B60N 2/015* (2006.01)
*B60N 2/36* (2006.01)

(58) Field of Classification Search
USPC .......................................... 297/378.1–378.14
See application file for complete search history.

(56) References Cited

U.S. PATENT DOCUMENTS

| | | | |
|---|---|---|---|
| 7,188,906 B2* | 3/2007 | Christoffel | B60N 2/01583 297/336 |
| 7,578,558 B2* | 8/2009 | Tanaka | B60N 2/2245 297/378.13 |
| 8,727,443 B2* | 5/2014 | Vedder | B60N 2/366 297/335 |
| 8,894,153 B2* | 11/2014 | Ohba | B60N 2/2352 296/65.03 |
| 9,039,089 B2* | 5/2015 | Ohba | B60N 2/2352 297/335 |
| 2003/0062749 A1* | 4/2003 | Liu | B60N 2/2354 297/284.4 |
| 2008/0084103 A1* | 4/2008 | Bock | A47C 1/03 297/411.35 |
| 2013/0134763 A1* | 5/2013 | Koch | A47C 17/02 297/440.23 |

FOREIGN PATENT DOCUMENTS

| | | |
|---|---|---|
| DE | 20 2011 100 040 U1 | 8/2011 |
| FR | 2 760 778 A1 | 9/1998 |
| WO | 2004/069580 A2 | 8/2004 |

* cited by examiner

VEHICLE SEAT WITH A LOCKING UNIT

CROSS REFERENCE TO RELATED APPLICATIONS

This application is a United States National Phase Application of International Application PCT/EP2014/052505, filed Feb. 10, 2014 and claims the benefit of priority under 35 U.S.C. §119 of German Patent Application 10 2013 002 820.5 filed Feb. 15, 2013 the entire contents of which are incorporated herein by reference.

FIELD OF THE INVENTION

The invention relates to a vehicle seat with a locking unit having a structural part which has a lock connection plate and a locking unit which is fixed to the lock connection plate, wherein the locking unit has at least one bearing bolt with a through-opening.

BACKGROUND OF THE INVENTION

A locking unit for a vehicle seat is disclosed in DE 10 2008 051 832 A1. Such a locking unit comprises a pivotably mounted rotary latch for locking with a bolt. A latching pawl which is pivotably mounted about a further pivot axis secures the rotary latch in the locked state. A clamping element denoted as the tolerance compensation pawl exerts a closing moment on the rotary latch and in this manner eliminates clearance present between the rotary latch and the bolt.

A locking unit for a vehicle seat is also disclosed in DE 20 2011 100 040 U1. The rotary latch of this locking unit has an approximately slot-shaped recess deviating from the circular shape, said rotary latch being pivotably mounted thereby on a bushing or a bearing bolt.

Such locking units serve, for example, for locking a backrest of a vehicle seat to a seat part and/or to a vehicle body or structure of a vehicle or for locking the vehicle seat to the body or structure of the vehicle. Engine hoods, tailgate flaps or doors of vehicles may also be locked by such locking units to the body or structure of the vehicle.

A generic vehicle seat having a locking unit is disclosed in DE 10 2008 033 304 A1. The locking unit in this case is fastened to a structural part, in particular a backrest of the vehicle seat and serves for locking the backrest to a structure of the vehicle and/or the body thereof. To this end, the locking unit comprises a rotary latch denoted as the pawl, which in the locked state of the locking unit encompasses a locking bolt fastened to the structure of the vehicle.

The locking unit comprises two bearing bolts which serve for the pivotable mounting of the rotary latch and two securing elements which are provided for securing the rotary latch in the locked state. The two bearing bolts also serve for fastening the locking unit to the structural part of the vehicle seat and are of approximately hollow cylindrical configuration. Moreover, two screws are provided for fastening the locking unit to the structural part of the vehicle seat, said screws respectively passing through each of the two bearing bolts and being screwed into the structural part or an additional nut.

SUMMARY OF THE INVENTION

The object of the invention is to improve a vehicle seat with a locking unit of the type mentioned in the introduction, in particular to increase the strength and load-bearing capacity of the connection between the structural part and the locking unit.

A generic vehicle seat comprises a structural part, in particular a backrest, which comprises a lock connection plate and a locking unit which is fixed to the lock connection plate, wherein the locking unit has at least one bearing bolt with a through-opening.

According to the invention, the lock connection plate in this case comprises at least one mating contour which projects into the through-opening of the at least one bearing bolt.

As a result, the mating contour also absorbs loads which act on the locking unit, in particular shear stresses occurring in the event of a crash. Thus, the load-bearing capacity of the connection between the structural part and the locking unit is increased. Moreover, the mounting of the locking unit on the lock connection plate is simplified as the mating contour represents a guide for the bearing bolt.

Preferably, the through-opening has a first axial portion with a first internal diameter and a second axial portion with a second internal diameter, wherein the second internal diameter is larger than the first internal diameter. The second axial portion forms, therefore, a receiver space for the mating contour in the interior of the first bearing bolt.

In this case, the second axial portion advantageously faces the lock connection plate in order to receive the mating contour.

If the external diameter of the mating contour corresponds to the second internal diameter of the through-opening, the locking unit is positively secured to the lock connection plate in the radial direction, whereby the mounting is further simplified.

If the length of the mating contour in the axial direction corresponds to the length of the second axial portion, the mating contour at least approximately entirely occupies the second axial portion, whereby the load-bearing capacity of the connection is further increased.

Preferably the internal diameter of the mating contour corresponds to the first internal diameter of the first axial portion of the through-opening.

According to an advantageous embodiment of the invention, the mating contour is configured as a collar. Such a collar is relatively simple to produce and is designed integrally with the lock connection plate, whereby a separate component is dispensed with.

Preferably a fastening means is provided for fastening the locking unit to the structural part, said fastening means passing through the through-opening.

The fastening means is advantageously configured as a screw with a head and a shank, whereby a relatively simple mounting of the locking unit to the lock connection plate is possible.

According to an advantageous development of the invention, the mating contour has an internal thread, the screw being screwed therein. As a result, a separate component is dispensed with.

According to an alternative embodiment, a nut is provided on the side of the lock connection plate remote from the locking unit, the screw being screwed therein.

According to a further embodiment, the fastening means is configured as a rivet. A relatively simple mounting of the locking unit to the lock connection plate is also possible thereby.

The structural part of the vehicle seat is, for example, a backrest.

Advantageously, the bearing bolt also serves for the pivotable mounting of a rotary latch which cooperates with a locking bolt.

The locking unit preferably has at least one further bearing bolt, at least one securing element, in particular a clamping element or a latching pawl, being pivotably mounted thereon.

The invention is described in more detail with reference to an advantageous exemplary embodiment shown in the figures. However, the invention is not limited to this exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
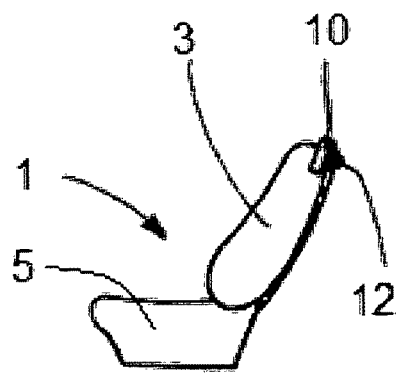
FIG. 1 is a schematic view of a vehicle seat.
Figure 2:
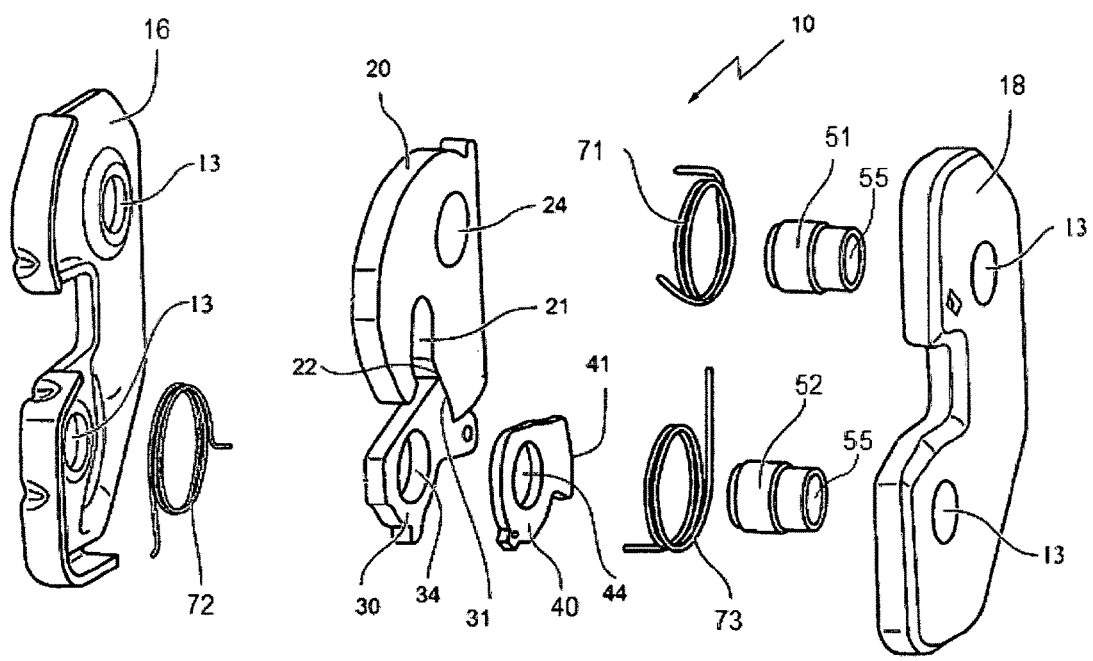
FIG. 2 is an exploded view of a locking unit.
Figure 3:
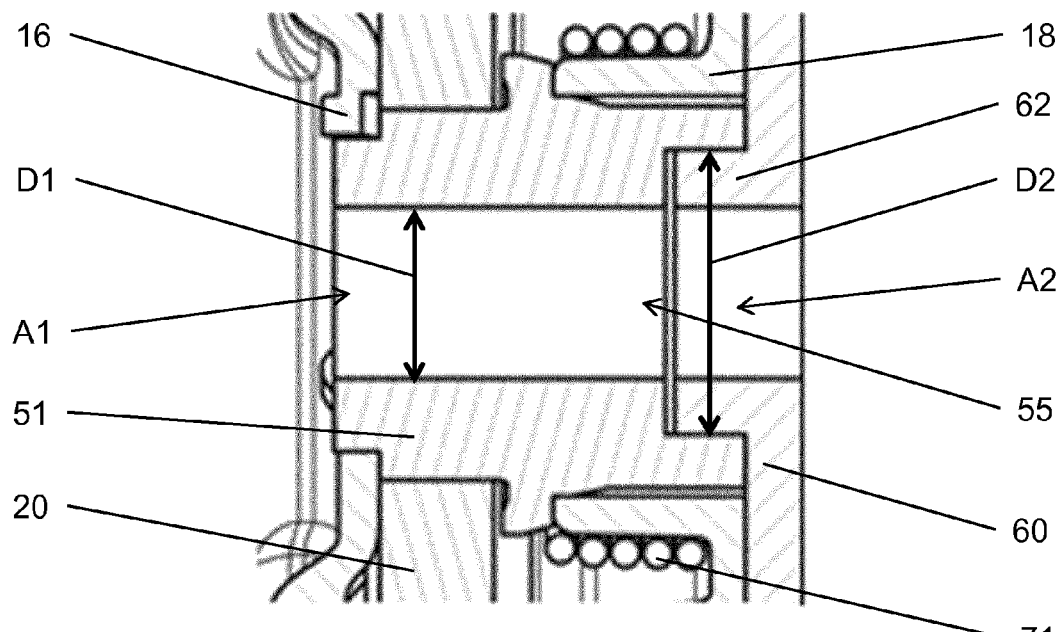
FIG. 3 is a sectional view through a bearing bolt of the locking unit according to FIG. 2.
Figure 4:
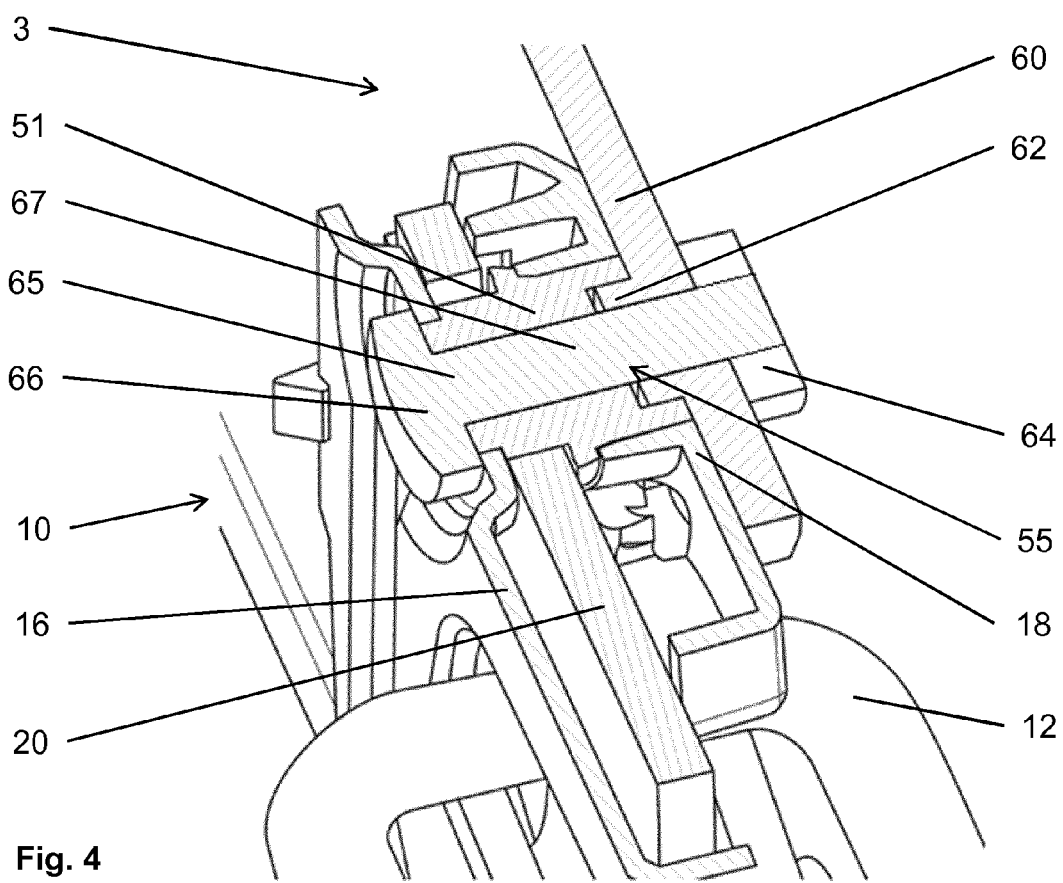
FIG. 4 is a perspective view of a section through a bearing bolt of the locking unit and a backrest.

In a motor vehicle, a locking unit 10 is provided for connecting a structural part, in the present case a backrest 3, of a vehicle seat 1, in particular of a rear seat, to a vehicle structure. The backrest 3 in this case is attached to a seat part 5 so as to be pivotable from a position of use into a position of non-use.

The locking unit 10 is also able to be used in other positions, for example for fastening the seat part 5 of the vehicle seat 1 to the floor structure of the motor vehicle or in a door lock.

The arrangement of the vehicle seat 1 inside the vehicle and the usual direction of travel thereof define the directional information used hereinafter. In this case a direction oriented perpendicular to the ground is hereinafter denoted as the vertical direction and a direction perpendicular to the vertical direction and perpendicular to the direction of travel is denoted hereinafter as the transverse direction.

The locking unit 10 has a lock housing which comprises a first side plate 16 and a second side plate 18. The bottom surfaces of the side plates 16, 18 in the present case are of planar design and arranged in a plane defined by the direction of travel and the vertical direction, i.e. perpendicular to the transverse direction. Each of the side plates 16, 18 comprises two bearing holes 13 which in the present case are of circular design.

The first side plate 16 and the second side plate 18 form a receiver which opens in the direction of a locking bolt 12, in order to receive said locking bolt for locking. In the present case, the locking unit 10 is fastened to the backrest 3 and the locking bolt 12 is fastened to the vehicle structure. It is also conceivable for the locking unit 10 to be fastened to the vehicle structure and the locking bolt 12 to be fastened to the backrest 3. The portion of the locking bolt 12 to be received by the receiver generally extends horizontally in the transverse direction.

A rotary latch 20 is pivotably mounted on a first bearing bolt 51 which in turn is fastened to the first side plate 16 and to the second side plate 18. To this end, the rotary latch 20 has a rotary latch hole 24 which in the present case is configured as a circular opening and which is penetrated by the first bearing bolt 51. The rotary latch 20 also has a hook mouth 21 for cooperating with the locking bolt 12. By means of a first spring 71, the rotary latch 20 is pretensioned in the opening direction.

The rotary pawl 20 has a functional surface 22 which partially defines the hook mouth 21 to the side. In the locked state the functional surface 22 approximately faces in the direction of a second bearing bolt 52 which is arranged parallel to the first bearing bolt 51 and thus also extends in the transverse direction. The functional surface 22 in the present case is of planar configuration but, for example, may also be curved in a circular-arc shaped manner and may be configured to be convex or concave.

On the side of the hook mouth 21 remote from the rotary latch hole 24, opposing the functional surface 22, the hook mouth 21 is defined to the side by a lug of the rotary latch 20.

The rotary latch 20 has a base body which is defined in the axial direction by one respective planar bottom surface. The width of the functional surface 22 corresponds to the thickness of the base body of the rotary latch 20, i.e. to the extent of the base body in the axial direction.

The first bearing bolt 51 is inserted into one respective bearing hole 13 of the side plates 16, 18 and protrudes perpendicular from the bottom surfaces of the side plates 16, 18. The first bearing bolt 51 thus extends horizontally in the transverse direction. In the present case, the preferably metal first bearing bolt 51 is riveted or caulked to the side plates 16, 18.

Also, the second bearing bolt 52 is inserted into one respective bearing hole 13 of the side plates 16, 18 and protrudes vertically from the bottom surfaces of the side plates 16, 18. The second bearing bolt 52 also extends, therefore, horizontally in the transverse direction. In the present case, the preferably metal second bearing bolt 52 is riveted or caulked to the side plates 16, 18.

The locking unit 10 in the present case is fastened, in the present case screwed, to a lock connection plate 60 which is part of the backrest 3. The lock connection plate 60 is designed to be substantially planar and extends in a plane perpendicular to the transverse direction. In this case, the second side plate 18 of the locking unit 10 bears against the lock connection plate 60, whilst the first side plate 16 faces away from the lock connection plate 60.

The first bearing bolt 51 is configured approximately in the shape of a hollow cylinder and has a through-opening 55 extending in the axial direction. In a first axial portion A1, the through-opening 55 has a first internal diameter D1. The first axial portion A1, starting on the first side plate 16 remote from the lock connection plate 60, extends in the axial direction toward the second side plate 18 and the lock connection plate 60.

In a second axial portion A2, the through-opening 55 of the first bearing bolt 51 has a second internal diameter D2. The second internal diameter D2 is larger than the first internal diameter D1. The second axial portion A2, starting on the second side plate 18 adjacent to the lock connection plate 60, extends in the axial direction toward the first side plate 16 and toward the first axial portion A1.

The first axial portion A1 is longer in the axial direction than the second axial portion A2. The first axial portion A1 extends in the present case approximately over three quarters of the axial extent of the first bearing bolt 51 and the second axial portion A2 extends in the present case approximately over a quarter of the axial extent of the first bearing bolt 51. However, other ratios of the length of the first axial portion A1 relative to the length of the second axial portion A2 are conceivable. The second axial portion A2 with the second diameter D2 forms a step relative to the first axial portion A1 with the first diameter D1 in the interior of the first bearing bolt 51.

On the lock connection plate 60 a mating contour 62 is formed on the side facing the locking unit 10. The mating contour 62 is in the present case of hollow cylindrical configuration. The external diameter of the mating contour 62 corresponds to the second diameter D2 of the second axial portion A2 of the first bearing bolt 51, and the internal diameter of the mating contour 62 corresponds to the first diameter D1 of the first axial portion A1 of the first bearing bolt 51. The length of the mating contour 62 in the axial direction corresponds to the length of the second axial portion A2.

The mating contour 62 of the lock connection plate 60 protrudes into the second axial portion A2 of the first bearing bolt 51 and in this case at least approximately entirely occupies said second axial portion.

In the present case, the mating contour 62 is configured as a collar and is thus designed integrally with the lock connection plate 60.

A fastening means configured as a screw 65 penetrates the first bearing bolt 51 in the axial direction. In this case, a head 66 of the screw 65 bears against the first side plate 16 of the locking unit 10. A shank 67 of the screw 65 passes through the first axial portion A1 of the first bearing bolt 51 and the mating contour 62 of the lock connection plate 60 adjacent thereto. The diameter of the shank 67 of the screw 65 corresponds approximately to the first diameter D1 of the first axial portion A1.

On the side of the lock connection plate 60 remote from the locking unit 10 a nut 64 is provided with an internal thread into which an external thread of the shank 67 of the screw 65 is screwed. The internal diameter of the nut 64 corresponds to the diameter of the shank 67.

The nut 64 in the present case is welded to the side of the lock connection plate 60 remote from the locking unit 10.

Alternatively the nut 64 may also be dispensed with, wherein the mating contour 62 then has an internal thread, the diameter thereof corresponding to the diameter of the shank 67 of the screw 65. The shank 67 of the screw 65 is then screwed into the internal thread of the mating contour 62.

Instead of configuring the mating contour 62 as a collar, it is also conceivable to attach a weld nut on the side of the lock connection plate 60 facing the locking unit 10, preferably by welding. The mating contour 62 is thus connected by a material connection to the lock connection plate 60. The weld nut then forms the mating contour 62. The external thread of the shank 67 of the screw 65 is then screwed into the internal thread of the weld nut, the diameter thereof corresponding to the diameter of the shank 67.

In the present case, the second bearing bolt 52 is of identical configuration to the first bearing bolt 51 and is also penetrated by a fastening means configured as a screw 65, and is secured to a further mating contour 62 of the lock connection plate 60.

The locking unit 10 is thus connected by means of two screws 65 to the lock connection plate 60.

A clamping element 40 is pivotably mounted on the second bearing bolt 52. To this end, the clamping element 40 comprises a clamping element hole 44 which in the present case is circular and which is penetrated by the second bearing bolt 52. By means of a third spring 73, the clamping element 40 is pretensioned toward the rotary latch 20.

In the locked state, when the hook mouth 21 of the rotary latch 20 receives the locking bolt 12, the clamping element 40 exerts a closing moment on the rotary latch 20 due to the pretensioning by the third spring 73 as a securing element. To this end, the clamping element 40 has a clamping surface 41 which is curved eccentrically relative to the second bearing bolt 52, which is in non-self-locking contact with the functional surface 22 of the rotary latch 20. The clamping surface 41 in the present case is configured to be curved in a circular-arc shaped and convex manner.

A latching pawl 30 is arranged on the second bearing bolt 52 axially adjacent to the clamping element 40, and also pivotably mounted on the second bearing bolt 52, i.e. aligned with the clamping element 40. To this end, the latching pawl 30 has a latching pawl hole 34 which in the present case is circular and which is penetrated by the second bearing bolt 52. By means of a second spring 72, the latching pawl 30 is pretensioned toward the rotary latch 20.

The latching pawl 30 in the present case is arranged adjacent to the first side plate 16 and the clamping element 40 in the present case is arranged adjacent to the second side plate 18. The latching pawl 30 and the clamping element 40 are coupled in entrainment with free travel, for example by means of a slot-pin-guide or by means of an axially protruding drive element.

The latching pawl 30 has a latching surface 31 which is located in the vicinity of the clamping surface 41 of the clamping element 40. In the locked state, the latching surface 31 is positioned spaced apart from the functional surface 22 of the rotary latch 20. The latching surface 31 in the present case is configured to be curved in a circular-arc shaped and convex manner but may also be planar.

The width of the functional surface 22 which corresponds to the thickness of the base body of the rotary latch 20 also approximately corresponds to the sum of the thickness of the latching pawl 30 and the thickness of the clamping element 40. The rotary latch 20, therefore, has approximately the same material thickness as the latching pawl 30 and the clamping element 40 together.

If, in the event of a crash, the rotary latch 20 is subjected to an opening moment and the clamping element 40 is forced away slightly, the latching surface 31 comes to bear against the functional surface 22 of the rotary latch 20. Thus, the latching pawl 30 serves for supporting the rotary latch 20 and, as a further securing element, prevents a further rotation of the rotary latch 20 in the opening direction. Thus, the latching pawl 30 prevents the opening of the rotary latch 20.

In the locked state of the locking unit 10, the locking bolt 12 is located in the receiver formed by the side plates 16, 18 and in the hook mouth 21 of the closed rotary latch 20. The clamping element 40 secures the rotary latch 20 by cooperation of the clamping surface 41 with the functional surface 22. The latching surface 31 of the latching pawl 30 is spaced apart slightly from the functional surface 22 of the rotary latch 20.

For opening the locking unit 10, the latching pawl 30 is pivoted away from the rotary latch 20, whereby the latching surface 31 of the latching pawl 30 moves further away from the functional surface 22 of the rotary latch 20. The latching pawl 30 drives the clamping element 40, due to the coupling in entrainment, so that the rotary latch 20 is no longer secured.

By the pretensioning due to the first spring 71, the rotary latch 20 opens, i.e. pivots in the opening direction. Alternatively or additionally to the pretensioning by the first spring 71, the rotary latch 20 may also be driven by the latching pawl 30 or by the clamping element 40 for opening.

Due to the pivoting movement of the rotary latch 20, the hook mouth 21 pulls back from the receiver formed by the side plates 16, 18 and releases the locking bolt 12 which moves counter to the pivoting-in direction of the locking unit 10. If the locking bolt 12 has left the hook mouth 21, the locking unit 10 is in the unlocked state.

If in this unlocked state the locking bolt 12 again enters the receiver formed by the side plates 16, 18 and comes to bear against the edge of the hook mouth 21, the locking bolt 12 forces the rotary latch 20 into its closed position. The clamping element 40 moves along the functional surface 22, due to its pretensioning by the third spring 73. Driven by the clamping element 40 or due to the pretensioning by the second spring 72, the latching pawl 30 pivots toward the rotary latch 20, wherein the latching surface 31 approaches the functional surface 22 of the rotary latch 20. Subsequently, the locking unit 10 is once again in the locked state.

The features disclosed in the above description, the claims and the drawings may be of significance both individually and also in combination with one another for the implementation of the invention in the various embodiments thereof.

While specific embodiments of the invention have been shown and described in detail to illustrate the application of the principles of the invention, it will be understood that the invention may be embodied otherwise without departing from such principles.

The invention claimed is:

1. A vehicle seat comprising:
a structural part, the structural part comprising a backrest, the backrest comprising a lock connection plate;
a seat cushion; and
a locking unit comprising a locking unit housing, the locking unit housing being non-movably fixed to the lock connection plate, wherein the locking unit comprises at least one housing opening and at least one bearing bolt with a bearing bolt through-opening and the lock connection plate comprises at least one mating contour which projects into the through-opening of the at least one bearing bolt, the bearing bolt being non-rotatably connected to the locking unit housing, at least a portion of the at least one bearing bolt being arranged in the at least one housing opening, the locking unit comprising a locked state and an unlocked state, the backrest being fixed relative to the seat cushion in the locked state, the backrest being pivotable relative to the seat cushion in the unlocked state.

2. The vehicle seat as claimed in claim 1, wherein the through-opening has a first axial portion with a first internal diameter and a second axial portion with a second internal diameter, wherein the second internal diameter is larger than the first internal diameter.

3. The vehicle seat as claimed in claim 2, wherein the second axial portion faces the lock connection plate.

4. The vehicle seat as claimed in claim 3, wherein an external diameter of the mating contour corresponds to the second internal diameter.

5. The vehicle seat as claimed in claim 3, wherein a length of the mating contour in the axial direction corresponds to a length of the second axial portion.

6. The vehicle seat as claimed in claim 3, wherein an internal diameter of the mating contour corresponds to the first internal diameter.

7. The vehicle seat as claimed in claim 1, wherein the mating contour is configured as a collar.

8. The vehicle seat as claimed in claim 1, wherein the through-opening is penetrated by a fastening means.

9. The vehicle seat as claimed in claim 8, wherein the fastening means is configured as a screw with a head and a shank.

10. The vehicle seat as claimed in claim 9, wherein the mating contour has an internal thread, the screw being screwed therein.

11. The vehicle seat as claimed in claim 9, wherein a nut is provided on the side of the lock connection plate remote from the locking unit, the screw being screwed therein.

12. The vehicle seat as claimed in claim 8, wherein the fastening means is configured as a rivet.

13. The vehicle seat as claimed in claim 1, wherein the structural part of the vehicle seat is a backrest.

14. The vehicle seat as claimed in claim 1, wherein a rotary latch is pivotably mounted on the bearing bolt.

15. The vehicle seat as claimed in claim 1, wherein the locking unit has at least one further bearing bolt, at least one securing element being pivotably mounted thereon.

16. The vehicle seat as claimed in claim 1, wherein the locking unit comprises a rotary latch and a latching pawl, the rotary latch being in contact with the latching pawl with the locking unit in the locked state, the rotary latch being at a spaced location from the latching pawl with the locking unit in the unlocked state, one of the rotary latch and the latching pawl being rotatably mounted on the bearing bolt, wherein the one of the rotary latch and the latching pawl is rotatable relative to the bearing bolt.

17. The vehicle seat as claimed in claim 16, wherein the locking unit comprises a further bearing bolt, wherein another one of the rotary latch and the latching pawl being rotatably mounted on the further bearing bolt.

18. The vehicle seat as claimed in claim 17, further comprising:
a first fastener, the lock connection plate comprising a first lock connection plate through opening and a second lock connection plate through opening, the first locking connection plate through opening being aligned with the bearing bolt through opening to define a first through opening, at least a portion of the first fastener being arranged in the first through opening;
a second fastener, wherein the locking unit housing has a second housing opening, at least a portion of the further bearing bolt being arranged in the second housing opening, the further bearing bolt comprising a further bearing bolt through opening, the second lock connection plate through opening being aligned with the further bearing bolt through opening to define a second through opening, at least a portion of the second fastener being arranged in the second through opening.

19. A vehicle seat comprising:
a backrest comprising a lock connection plate, the lock connection plate comprising a lock connection plate through opening;
a seat cushion;
a fastener; and
a locking unit comprising a locking unit housing, the locking unit housing being non-rotatably fixed to the lock connection plate, wherein the locking unit comprises at least one housing opening and at least one bearing bolt with a bearing bolt through-opening and the lock connection plate comprises at least one mating contour which projects into the through-opening of the at least one bearing bolt, wherein the bearing bolt is non-rotatably connected to the locking unit housing, at least a portion of the at least one bearing bolt being arranged in the at least one housing opening, the lock connection plate through opening being arranged opposite the bearing bolt through-opening, at least a portion of the fastener being arranged in the locking connection plate through-opening and the bearing bolt through-opening, the locking unit comprising a locked state and an unlocked state, the backrest being fixed relative to the seat cushion in the locked state, the backrest being pivotable relative to the seat cushion in the unlocked state.

20. A vehicle seat comprising:
a backrest comprising a lock connection plate, the lock connection plate comprising a lock connection plate through opening;
a seat cushion;
a fastener; and
a locking unit comprising a locking unit housing and a rotary latch, the locking unit housing being non-rotatably fixed to the lock connection plate, the locking unit being in direct contact with the lock connection plate, wherein the locking unit comprises at least one housing opening and at least one bearing bolt with a bearing bolt through-opening and the lock connection plate comprises at least one mating contour which projects into the through-opening of the at least one bearing bolt, the rotary latch being rotatably connected to the at least one bearing bolt, wherein the rotary latch is rotatable relative to the at least one bearing bolt and the bearing bolt is non-rotatably connected to the locking unit housing, at least a portion of the at least one bearing bolt being arranged in the at least one housing opening, the lock connection plate through opening being arranged opposite the bearing bolt through-opening, at least a portion of fastener being arranged in the locking connection plate through-opening and the bearing bolt through-opening, the locking unit comprising a locked state and an unlocked state, the backrest being fixed relative to the seat cushion in the locked state, the backrest being pivotable relative to the seat cushion in the unlocked state.

* * * * *